United States Patent Office 3,287,240
Patented Nov. 22, 1966

3,287,240
PRODUCTION OF VINYL CHLORIDE
Shigeru Tsutsumi, 204 Okashinmachi, Hirakata, Japan
No Drawing. Filed Oct. 1, 1962, Ser. No. 227,576
Claims priority, application Japan, Oct. 11, 1961,
36/36,855
4 Claims. (Cl. 204—163)

This invention relates to the manufacture of vinyl chloride which is carried out by reacting ethylene with chlorine under a reduced pressure.

The major difficulty involved in the reaction of ethylene with chlorine is the formation of by-products, such as free carbon, tarry substances and addition products, with consequent reduction in the yield of the desired vinyl chloride. It is also impractical to repeat the reaction.

To prepare vinyl chloride under normal pressure, accordingly, the EDC method is employed wherein ethylene is reacted with chlorine and the resultant ethylene dichloride is pyrolyzed. Alternatively, ethylene dichloride is pyrolyzed in the presence of ethylene and chlorine as disclosed in the United States Patent 2,374,237.

According to the EDC method, however, the pyrolysis requires such a high temperature as from 500° to 600° C., so that the reaction vessel is badly corroded by the hydrogen chloride generated as a by-product, and the reaction is carried out in two stages involving complicated apparatus and operations. The quoted United States patent requires no such high temperature, but the accompanying low reaction degree and technical difficulties involved in separating the unreacted chlorine from the final product are insurmountable.

The method of this invention, on the contrary, comprises reacting ethylene in molar excess with chlorine under a reduced pressure at a temperature between 300° and 400° C. The reaction being carried out without the presence of ethylene dichloride, the formation of tarry substances and other by-products is greatly reduced, and almost the whole quantity of the ethylene converted is converted into the desired vinyl chloride at a relatively low temperature which is not high enough for the corrosive action of the hydrogen chloride generated in the reaction system.

According to the method of this invention, good yields are obtained under an absolute pressure of 460 mm./Hg or lower. For instance, in the 4:1 by volume reaction of ethylene with chlorine carried out under normal pressure at 380° C., the yield ratio of tarry substances and other by-products to the desired vinyl chloride is 5 to 6:5 to 4 by weight. In accordance with the principle of this invention, however, the ratio can be improved to 2:8 when the same reaction is carried out under a pressure of —300 mm./Hg; the formation of by-products is greatly reduced under —400 mm./Hg, yielding 85 to 90 percent of vinyl chloride on the ethylene employed; and no by-products are formed under —500 mm./Hg with a yield of 95 percent or more. But it is found impossible for a further reduced pressure to further improve the yield of vinyl chloride.

In the present invention, ethylene is employed in molar excess in relation to chlorine, so that almost the whole quantity of the ethylene converted is converted into vinyl chloride and the formation of by-products is greatly reduced. The unreacted ethylene is preferably recycled through the reaction system.

The pressure employed is a function of the proportion of ethylene and chlorine. When the proportion of ethylene to chlorine is large, the reaction can be carried out under a relatively low degree of reduced pressure, and vice versa. For instance, when 7 to 10 volumes of ethylene are reacted with one volume of chlorine at 380° C., a good yield may be obtained under an absolute pressure of 460 mm./Hg. But the same yield cannot be obtained at said temperature except under an absolute pressure of 210 mm./Hg or lower when the ratio is reduced to 3:1.

In the present invention, the reaction can be carried out by diluting raw ethylene with a diluent, such as nitrogen, carbon monoxide, carbon dioxide, methane or a mixture of said gases. On this occasion, ethylene can be converted almost 100 percent into vinyl chloride, insofar as the reaction is carried out under an absolute pressure of 460 mm./Hg or lower, even when the starting materials are employed in equimolar proportion. In case the ethylene content in the gas mixture is about 10 percent by weight, the reaction takes place at a temperature of from 300° to 400° C., insofar as ethylene is employed in molar excess to the chlorine employed and the pressure is reduced to from —50 mm./Hg to —100 mm./Hg. From the industrial point of view, however, the reaction is preferably carried out under an absolute pressure of 460 mm./Hg or lower.

The temperature employed varies with the molar proportion of the starting materials, but the reaction is preferably carried out at a temperature ranging from 300° to 400° C. Application of ultraviolet rays reduces the temperature required by about 30° C. When exposed to ultraviolet rays, for instance, the 4:1 by volume reaction of ethylene and chlorine which takes place at 350° to 380° C. can be carried out at 320° to 350° C., and the 7 to 10:1 reaction at 380° to 400° C. may take place at 350° to 380° C., the pressure employed throughout said reactions being 460 mm./Hg. But methane cannot be employed as a diluent when the reaction system is exposed to ultraviolet rays.

Preferred examples are as follows:

Example 1

A stainless steel tube, 28 mm. in internal diameter and 30 cm. long and provided at the bottom with gas inlets for ethylene and chlorine, was vertically housed in a tubular electric furnace in such a manner that heat could be applied to the central area, 25 cm. long, of said tub. The tube reactor was then heated to 380° C., and ethylene (17 l./hr.) and chlorine (4.3 l./hr.) were passed therethrough under —500 mm./Hg. The resultant gas product was led through the top outlet into a 25% aqueous solution of caustic soda at 20° C. to remove the hydrogen chloride gas, dried by passing through a calcium chloride tower, liquefied at —60° C. and rectified by distillation. The yield of vinyl chloride on the converted ethylene was 95.8%.

Example 2

In the central area of the reactor as employed in Example 1 was inserted a mercury quartz lamp, 40 cm. long and 10 mm. in internal diameter, with the bottom end vertically fixed to the bottom of said reactor. The reaction was carried out in the reactor under the same conditions as employed in Example 1, except that the gas mixture was exposed at 350° C. to the ultraviolet rays emitting from the lamp. The gas product was then led through the top outlet and removed of the hydrogen chloride gas with caustic soda as in Example 1, yielding a gas containing 21.2% of vinyl chloride. The gas thus obtained was then liquefied and rectified by distillation as in Example 1. The yield of vinyl chloride on the converted ethylene was 95.5%.

Example 3

Through the reactor as employed in Example 1 were passed chlorine (1.9 l./hr.) and a mixture (19 l./hr.) of 90% by volume of nitrogen and 10% by volume of ethylene under an absolute pressure of 460 mm./Hg at 370° C. The gas product was led through the top outlet into a 25% aqueous solution of caustic soda at 20° C. to remove the hydrogen chloride gas, liquefied and rectified as in Example 1. The yield of vinyl chloride on the converted ethylene was 96%.

The same result was obtained with 90% by volume of carbon monoxide employed instead of nitrogen.

What I claim is:

1. A method for the production of vinyl chloride which comprises reacting chlorine with ethylene under absolute pressure of up to 460 mm. Hg inclusive at a temperature ranging from 300° to 400° C., said ethylene being in molar excess in relation to the chlorine.

2. The process of claim 1 in which the reaction is carried out under irradiation with ultra violet rays.

3. A method for the production of vinyl chloride which comprises reacting chlorine with ethylene diluted with at least one member selected from the group consisting of nitrogen, carbon monoxide and carbon dioxide under an absolute pressure of up to 460 mm. Hg inclusive at a temperature ranging from 300° to 400° C., the quantity of said ethylene being at least equimolar with respect to the chlorine.

4. A method which comprises reacting chlorine with ethylene containing methane as a diluent in the absence of ultra violet rays under an absolute pressure of up to 460 mm. Hg inclusive at a temperature ranging from 300 to 400° C., the quantity of said ethylene being at least equimolar with respect to the chlorine.

References Cited by the Examiner

UNITED STATES PATENTS 2,896,000  7/1959  Miller et al. _____ 260—656

FOREIGN PATENTS 635,013  3/1950  Great Britain.

JOHN H. MACK, *Primary Examiner.*

H. S. WILLIAMS, *Examiner.*